United States Patent [19]

Hoffmann et al.

[11] Patent Number: 4,909,937

[45] Date of Patent: Mar. 20, 1990

[54] INTEGRAL FILTERS FOR SEPARATING FLUID COMPONENTS AND HOUSING FOR THEM

[75] Inventors: Jürgen Hoffmann, Hardegsen-Ellierode; Joachim Stinzendörfer, Göttingen, both of Fed. Rep. of Germany

[73] Assignee: Sartorius GmbH, Fed. Rep. of Germany

[21] Appl. No.: 157,624

[22] Filed: Feb. 19, 1988

[30] Foreign Application Priority Data

Feb. 20, 1987 [DE] Fed. Rep. of Germany ....... 3705398

[51] Int. Cl.$^4$ ............................................. B01D 29/26
[52] U.S. Cl. .................................. 210/315; 210/317; 210/338; 210/458; 210/487; 210/493.2
[58] Field of Search ............... 210/315, 317, 338, 342, 210/487, 492, 458, 440, 493.1, 493.2, 497.01, 497.2, 436, 472, 505; 55/482

[56] References Cited

U.S. PATENT DOCUMENTS

| | | | |
|---|---|---|---|
| 547,923 | 10/1895 | Isbell | 210/315 |
| 575,478 | 1/1897 | Haefner | 210/338 |
| 1,764,660 | 6/1930 | Sweetland | 210/505 |
| 2,007,336 | 7/1935 | Malivert | 210/436 |
| 2,028,062 | 1/1936 | Goldman | 210/440 |
| 2,511,800 | 6/1950 | Wilkinson | 210/440 |
| 2,651,414 | 9/1953 | Lawson | 210/338 |
| 2,833,415 | 5/1958 | Wilkinson | 210/440 |
| 2,855,104 | 10/1958 | Wilkinson | 210/493.1 |
| 3,155,117 | 11/1964 | Spillman | 210/505 |
| 3,452,877 | 4/1967 | Mesek et al. | 210/491 |
| 3,488,928 | 1/1970 | Tarala | 55/482 |
| 4,104,170 | 8/1978 | Nedza | 210/487 |
| 4,253,954 | 3/1981 | Midkiff et al. | 210/493.1 |
| 4,384,474 | 5/1983 | Kowalski | 210/95 |
| 4,614,109 | 9/1986 | Hofmann | 73/38 |

FOREIGN PATENT DOCUMENTS

| | | |
|---|---|---|
| 1029345 | 5/1958 | Fed. Rep. of Germany . |
| 1950068 | 6/1970 | Fed. Rep. of Germany . |
| 2645634 | 11/1977 | Fed. Rep. of Germany . |
| 2840117 | 4/1979 | Fed. Rep. of Germany . |
| 3103723 | 9/1982 | Fed. Rep. of Germany . |
| 3318940 | 11/1984 | Fed. Rep. of Germany . |
| 3335938 | 4/1985 | Fed. Rep. of Germany . |
| 2152471 | 8/1985 | United Kingdom . |

OTHER PUBLICATIONS

Hofmann "Integrity Testing of Microfiltration Membranes", Journal of Parenteral Science and Technology, vol. 38, No. 4, Jul. 1984, pp. 148–158.

Soules "Filter Cartridge Standards," Chemical Engineering Progress, vol. 70, No. 12, Dec. 1984, pp. 43–51.

Primary Examiner—Richard V. Fisher
Assistant Examiner—Christopher Upton
Attorney, Agent, or Firm—Eric P. Schellin

[57] ABSTRACT

In an integral filter (F) for separating fluid components which filter can be enclosed in a surrounding housing (1,2) with fluid connections (A1 l to A3, 10) the permeable tube jacket of which filter consists of several tubular filter elements (K1, K2) with different filter qualities whose cross sections are stepped in such a manner that a smaller filter element is surrounded by a larger filter element, optionally with formation of an intermediary space (Z1), and in which the two tube ends are enclosed by closure and connection adapters (15, 20, 21, 22, 27, 31) and can be adapted to fluid chambers (13, 14) of the housing, sections of the total filter (F) can be selectively tested for integrity, supplied with and emptied of fluid and filling substances via an intermediary space (Z1) between two filter elements (K1, K2) which intermediary space can be separately controlled and loaded from the outside.

2 Claims, 5 Drawing Sheets

INTEGRAL FILTERS FOR SEPARATING FLUID COMPONENTS AND HOUSING FOR THEM

This invention is relates to integral filters with a specific and stepped separating characteristics for fluid components according to the main part of the invention and a filter housing for them.

BACKGROUND OF THE INVENTION

It is known in fuel and oil filters (De-OS 31 03 723, DE-OS 28 40 117 and U.S. Pat. No. 4,253,954) that intermediary spaces can be located between filter elements in order to remove substances from the intermediary space, e.g. water or a first filtrate, separated in a first filter stage.

The basic concept filter unit, filter element (base filter element, large filter element), filter housing and filter device are used in the test concerning the state of the art according to the following definitions:

The sum of the filter-active individual layers, including the protective filter layers (protection during machining and during the insertion into the device) and drainage layers, of an individual filter element are called FILTER UNIT in the following.

A filter unit equipped with safety member (e.g. backwash protection and core in filter cartridges) which unit was processed in such a manner (e.g. sealing of the front sides, positioning of adapters) that it can be inserted in a filtration-active manner into a filter housing either directly (as based filter element) or after joining together several base filter elements to large filter elements is called a FILTER ELEMENT in the following.

One or several filter elements are inserted in a FILTER HOUSING and operated connected in parallel.

In a filtration device, for example, several filter housings are connected in series. The filtration process is controlled with appropriate fittings, peripheral devices and media and energy sources.

The invention relates for example, to integrated, tubular filter elements for the filtration of very different types of fluids (liquids and/or gases with various components—from true solutions via colloidal solutions via suspensions, emulsions, aerosols, smokes, etc. to liquid or gas mixtures).

In known filter elements, the object of the filtration is the separation of all or certain components of the fluid. Either the permeate (filtrate) or the retenate (concentrate) or both are of interest, depending on the application.

The quality and quantity of the separation is directly related to the filter media and filtration methods used.

The filter media can exhibit an absorptive, absorptive, electrochemical, catalytic and mechanical (deep action, sieve action) action. Such filter media are currently used in many forms as powder, granulate, staple fiber or monofil fiber mesh, threads, plane filters (round filters, sheets, roller item), filter mats, filter layers and filtration bodies which are sintered, mailed or produced in some other manner.

A distinction is also made between deep filters and sieve filters. The former are characterized in that the exclusion quantity is not absolutely considered and physical parameters influence the separation quality in a decisive manner. The classic sieve filters comprise, in addition to defined fabrics (in contrast to non-woven), the so-called membrane filters with the separating quality of microfilters, ultrafilters and filters for reverse osmosis. The class of "dense" membrane filters comprises filters for the separation of gases, prevaporation, ion exchange membranes and the like.

The use of these filter media has rapidly increased in recent years. This is particularly true for the group of membrane filters, which can be manufactured and processed in such a stable manner now that filter elements with sufficient filter area can be produced and can be combined in a modular design to quite large-area systems. The latter are frequently used in combination with deep filter systems, whereby in most instances the deep filters are used in the prefiltration state and have the task of precleaning the fluid in such a manner that the safety stage or final filtration stage can be economically employed.

The service life (flowthrough amount until irreversible blockage) and therewith the economy of the entire filtration system an be optimized as regards usage by means of stepped and specific prefiltration and appropriate graduation in the final filtration. The area of application of the aforementioned filter elements is very broad. They are indispensible in the pharmaceutical, electrical and semicondutor industries, biotechnology, medical technology, chemical industry, energy-supply industry, environmental protection and in the food industry (diaries, beverages, primary food products).

Such tubular filter elements, also designated in the ar as filter cartridges, are known in very many designs, in pleated, wound form with a great variety of stepped, multi-layer filter materials. The following publications regarding the state of the art constitute examples for such filter cartridges:

DE-OS 1 950 068
U.S. 3,452,877
DE-AS 1 029 345
DE-OS 33 18 940
DE-OS 26 45 634
GB-OS 2,152,471

In the specific prefiltration or stepped filtration, it is customary at the present time to connect different filtration stages in series in a discontinuous or continuous manner. Thus, for example, in the making of wine, a coarse or fine separation by centrifuge and a discontinuous clarification of the wine are frequently performed and the wine is subsequently filtered via a so-called layer filter (open system with layer filter plates in a layer filter press, or closed system with "plates" of layer filter units arranged like Chinese lanterns) before the so-called final or sterile filtration via membrane filter cartridges. The number of the necessary filter units can be coordinated with each other by means of differently dimensioning the series-connected housings and varying the housing equipment.

The disadvantage of such specific and stepped filtration is on the one hand the discontinuity and on the other hand the plurality of systems and methods which requires a plurality of devices, especially filter housings, to receive the various filter elements. Every additional device or housing increases not only the space requirement but also the investment expenses for devices, fittings and peripheral devices as well as the expenses for operation and maintenance (setting periods, time required for rinsing, moistening, testing, sterilizing, cleaning). The danger of secondary contamination and process disruptions and the associated product losses and/or product damage increases to a degree which is more than proportional.

A first attempt to render specific and stepped filtration more economical is constituted e.g. by filter cartridges in whose filter unit deep filters are arranged over one another in a laminar and multi-layer fashion in front of membrane filters and/or membrane filters with a differing separating characteristic (pore size, cut-off) are arranged in series within an element.

A disadvantage of this solution is, e.g. in the case of pleatings, the fact that the various filter-active layers of a filter unit always function in a ratio of 1:1. It is correspondingly difficult to find filter media which permit an optimum utilization of the filter capacity (all layers blocked in the same manner). Secondly, the number of maximally integrally cooperating layers is limited from a purely manufacturing viewpoint. As the number of filter layers which function in a filter unit increases, the risk also increases that during the testing of the filter efficiency of the filter element, valuable, good material must be discarded on account of a small defect in a single filter layer. Moreover, as the the number of filter-active components increases, it becomes more and more difficult to check the efficiency of the individual component in conjunction with the finished filter unit and to interpret the test results.

These problems can be explained using the exampled of pleated membrane filters.

Microfilter systems, especially for sterile filtration, are subjected before and after filtration to so-called integrity tests which are intended to assure filtration safety. These tests include the bubble-point or bubble-pressure test, pressure-resistance test and the diffusion test. These tests correlate with destructive charge test, the so-called bacteria-challenge tests in which the output capacity of membrane filters or membrane filter products is determined with standardized test germs according to a standardized test method.

In spite of these physical integrity tests being automated, this type of test involves considerable uncertainty. This uncertainty increases as the filter area is enlarged to a degree which is more than proportional.

Large (individually testable) filter areas are generated today as follows: Rather small base elements are individually tested and then combined axially to larger units (welded, adhered, sealingly inserted...). These large filter units are again subjected to a test. Filter units which test defective or non-functional are discarded.

A further enlargement of area (output) is performed by connecting in parallel several such large filter units (e.g. multiple cartridges) in large housings.

Aside from the great testing expense, this design has the great disadvantage that in spite of automatzation, only a collective measurement is performed, that is, it is just as difficult to distinguish between individual defects of individual filter elements in a large or multiple housing as it is between individual defects of individual base elements which make up large filter element. In the case of large areas, aside from the fact that economy is no longer present even at low separation rates, an interpretation of the test result is becoming more and more difficult and critical, at least for the pressure retention and diffusion test.

In these methods, the volume of the test gas diffusing through the filter unit of the filter element to be tested or the pressure drop which this causes is determined on the approach flow side. The allowed diffusion volume theoretically increases proportionally to the filter area. Practice as shown, however, that this diffusion volume is also considerably influenced by other parameters. These parameters include temperature, layer thickness, moistening behavior, the chemical nature of the filter media, the chemical nature of the media with which the filter unit is operated. Thus, the diffusion volume is composed of very different components. Whereas diffusion caused by genuine defects can be unambiguously recognized in small-area systems due to the magnitude, this is no longer possible in large-area systems since allowed diffusion and diffusion caused by small but damaging defects are of the same magnitude. This is also the reason why a visual determination of the bubble point is extremely difficult in large housings.

It can be determined that all suggestions for testing filter element in a large housing individually and economically have not been successful.

It is therefore frequently necessary, if the integrity test has failed and after operational disturbances during production (filtration), to test the operational capacity of the individual filter elements. To this end, the filter housings must usually be emptied, the filter elements taken out and individually tested. As the number of filter housings increases, the cost for time, personnel and expresses naturally increases, as does the amount of product loss and the danger of product damage and secondary contamination.

Another disadvantage of filter units of a known type connected in series invarious housings is the fact that in the case of failure or defect of only one series connected element, frequently the entire following filter housing is also involved, that is, all elements of this housing are prematurely blocked.

Large filter areas are becoming more and more indispensible today if filtration as separation method is to remain economical and competitive.

In addition to the separating quality, three criteria determine th economy and reliability of filtration systems:
 Service life
 Flowthrough per area and time
 Testability The problem of testability has been often described.

The problem of service life has also been explained in detail. It remains to be noted here that the attempt is being made more and more often currently to regenerate "blocked" filter units or filter units which are no longer filter-active. This occurs e.g. by means of the use of chemical cleaning agents, which is naturally limited by the chemical compatibility of the system as well as by means of washing processes with active washing media in or counter to the direction of filtration.

The disadvantages of the washing methods reside in the fact that during washing, filter units or devices which are downstream in the direction of filtration can be excessively loaded if bypass lines are not installed, which require a complicated apparatus and are usually also expensive. On the other hand, a backwash (counter to the direction of filtration) involves the risk of destroying the filter element. This is especially critical at the end position and should particularly be avoided if the end position itself is not blocked but rather an upstream filter element is blocked which can not be individually controlled.

The problem of flowthrough per time and area is naturally also coupled to the separating characteristic, the testing problem and the service life problem. Usually, this problem is solved by means of a high, freely accessible area with appropriate dimensioning and shaping of inlets and outlets as well as of the flow guidance.

In the case of gas filtration, this means enlarged inner core diameter (loss of area) in the case of commercially available filter cartridges and many individual units of low overall height (testability, apparatus cost!) on one housing plane.

The disadvantage of the solution of the problem is congruent with the above comments.

The invention therefore has the problem of eliminating the disadvantages of the known filter units or filter elements with simple means, that is, to create a compact integral filter for specifically stepped filtration (multiple filtration) which filter makes good use of the given filtration space in a surrounding housing, makes optimum use of the filter materials used, permits directed solutions to problems, is economical to manufacture and is easy to service without the solution of the aforementioned partial problems worsening the integral in relation to current individual filter elements as regards its possible testability according to varied testing criteria and without the possibilities of supplying and emptying the integral filter being worsened.

SUMMARY OF THE INVENTION

This problem is solved by th invention by means of the features indicated in the main claim, whereby at least two filter elements are stepped in their diameters in such a manner that the hollow area of the large filter element (main filter element), which hollow area is surrounded by the tube jacket, receives at least one smaller filter element (subfilter element) and at least one of these several filter elements forms a filter element (integrity filter) tested or testable for integrity. This means that a hollow area surrounded by the inner jacket is used to receive at least one independent base filter element which forms the next-following or parallel filter stage.

By positioning a filter element in the filter element, the area requirement of the different-type filter elements with different prices can be adapted to the actual requirement during the filtration type of very different types of media by the combination of different, standardized components. Since the filter elements form functionally independent elements in the individual fitter stages, they can also be test independently at the manufacturer's and also at the user's site for integrity within a common housing if either the intermediary space between two filter elements or the inner hollow area is individually controlled or approached by the flow and the pressure conditions upstream or downstream can be controlled or certain filter layers are connected in such a manner that downstream or upstream elements can also be tested individually. It is also advantageous and sufficient if only the filter elements of one filtration stage, preferably the so-called safety filtration stage (integrity filter) and the smallest filter element in area, are tested within the various filtration stages. The exclusion and testing expense can be considerably reduced by testing before assembly. The handling during insertion and removal into and from the surrounding large housing of high-grade steel is also simplified by means of the integration of various specific and stepped filter elements to an integral filter.

The concept of the invention will now be explained in several embodiments with reference made to the enclosed drawings.

BRIEF DESCRIPTION OF THE INVENTION

DETAILED DESCRIPTION OF THE VARIOUS EMBODIMENTS

Figure 1:
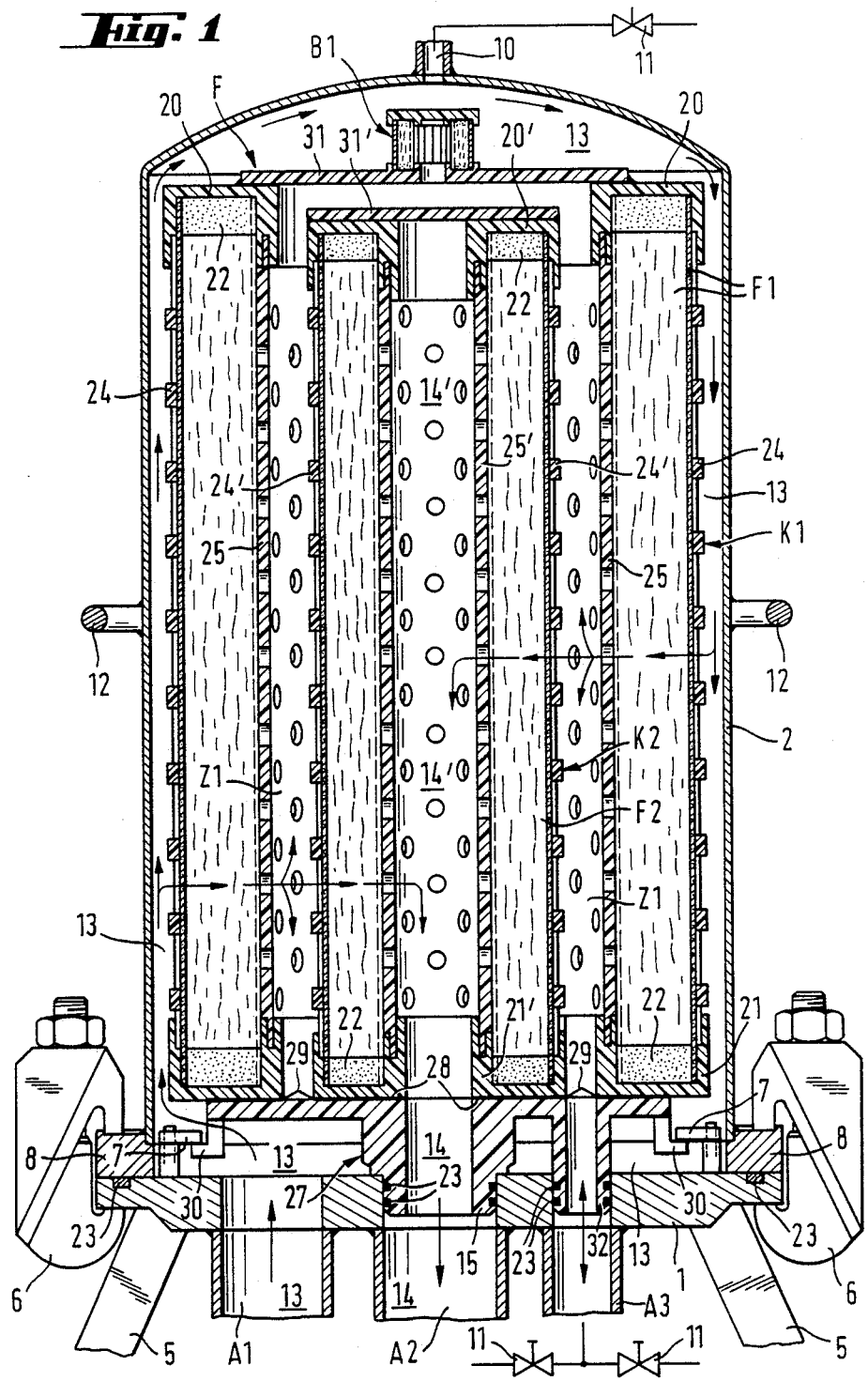
FIG. 1 is a schematic view of vertical section through a filter housing with inserted integral filter element according to the invention.

A housing of high-grade steel suitable for use in the beverage industry using integral filter F of the invention consists according to FIG. 1 of housing base 1 with three connections A1, A2, A3 for supplying and emptying housing 1 to 12 supported on housing legs 5. Bell-shaped upper hosing part 2 with reinforcing crown 8 is connected in a sealing manner to housing base 1 with interpositioning of elastic O ring seals 23 with the aid of tensioning elements 6 distributed over the circumference. Upper housing part 2 comprises ventilation piece 10 at its highest point with valve arrangement 11. Upper housing part 2 can be entirely removed form housing base 1 by hand grips 12 after tensioning elements 6 have been loosened, so that housing base 1 is also readily accessible from within for providing and removing integral filter F. Centrally located connection A2 merges into a housing perforation which forms the actual sterile chamber 14 and integral filter F, which will be described in more detail later, engages by connecting adapter 27 with connecting piece 15 by means of O ring seals 23 into this housing perforation. Several locking elements 7 distributed over the circumference of housing base 1 can be brought into engagement with locking elements 30 on connecting adapter 27 so that integral filter F is entirely locked in an axial direction and is secured against a backwash from connections A2 to A3.

The two filter cartridges K1 and K2 are constructed, as regards their basic elements with exception of their size and filter materials, of components which essentially correspond to each other. Each of the two filter cartridges K1 and K2 consists of an annular front adapter 21,21' and 20,31,30',31' which are U-shaped in section and consists of the actual tubular filter element F1 and F2, which are connected sealing means 22 to front adapters 21,21' and 20,31,20',30'. in a leak-proof manner to the front sides by means of Grid-shaped or perforated outer securing members 24 and 24' and inner securing members 25 and 25' impart the necessary radial and axial stability against pressure and traction loads to filter cartridges a' which loads occur in housing 1,2 during testing and during the filtration process. However, these perforated securing members 24,24' also form fluid intermediary spaces Z (21-24), at a very close arrangement of the integrated filter cartridge which intermediary spaces are filled with fluid (gas or liquid) during the operation of the filter unit.

In this embodiment, front adapter 20,31 of outer filter cartridge K1 is designed in two parts, that is, annular front adapter 20 is closed at the top by a welded-on closure plate 31 or by a closure adapter. Closing element 31 (closure adapter) can also function as filling opening for auxiliary filter means (not shown) which can be positioned in intermediary space Z1 between filter cartridge K1 and K2. Front adapter 20' comprises closing element 31 in a corresponding manner.

The two filter cartridges K1, K2 can of course have the same overall height and a common closure plate 31, whereby centering elements and grooves for receiving welding or adhering means also simplify assembly and integration.

Adapter 27 comprises centering element 29 on its upper side facing filter cartridges K1,K2 which centering element extends into intermediary space Z1 and simplifies the centering and assembly of filter cartridges K1,K2 with connecting adapter 27. Front adapters 21,21' are connected in a leak-proof manner by adhesion, flush welding or ultrasonic welding in the zone indicated at 28 to connecting adapter 27 so that fluid introduced into prefilter chamber 13 of the housing via connection A1 can only penetrate through filter element F1 into intermediary space Z1 and from there through filter element F2 into core 14' and from there into sterial chamber 14. A connection via adapters with O ring seals is also possible instead of the permanent connection.

In order to supply and empty intermediary space Z1 between filter cartridges K1 and K2 with/a testing media (gas or liquid), washing media, cleaning media, sterilization media and auxiliary filter means, this intermediary space Z1 is connected to connection A3 by adapter connection piece 23. All connections and supply lines are normally provided with cut-off valves 11 in order to make an individual regulation possible.

It can be necessary in certain instances of use in the filtration of liquids to degas intermediary space Z1 into prefilt chamber 13. To this end, hydrophobic ventilation filter B1 is located in closure element 31 or the filter element comprises a hydrophobic, gas-permeable surface part.

If relatively large intermediary space Z1 is to be eliminated, filter cartridge K2 can be directly connected to the adapter of filter cartridge K1 in a leakproof manner using modified front adapters 20,31,21. Either the pleating height of filter element F1 or of F2, that is, the fold depth, and therewith the filter area can be enlarged thereby so that the outer surface of filter element F2 can rest directly on inner securing member 25 of filter cartridge K1 with elimination of its outer securing member 24'. Yet, the individual testability remains completely retained before and after the assembly of filter cartridge K2 since a smaller free area remains pressured by perforated support members 24,25.

Figure 2:
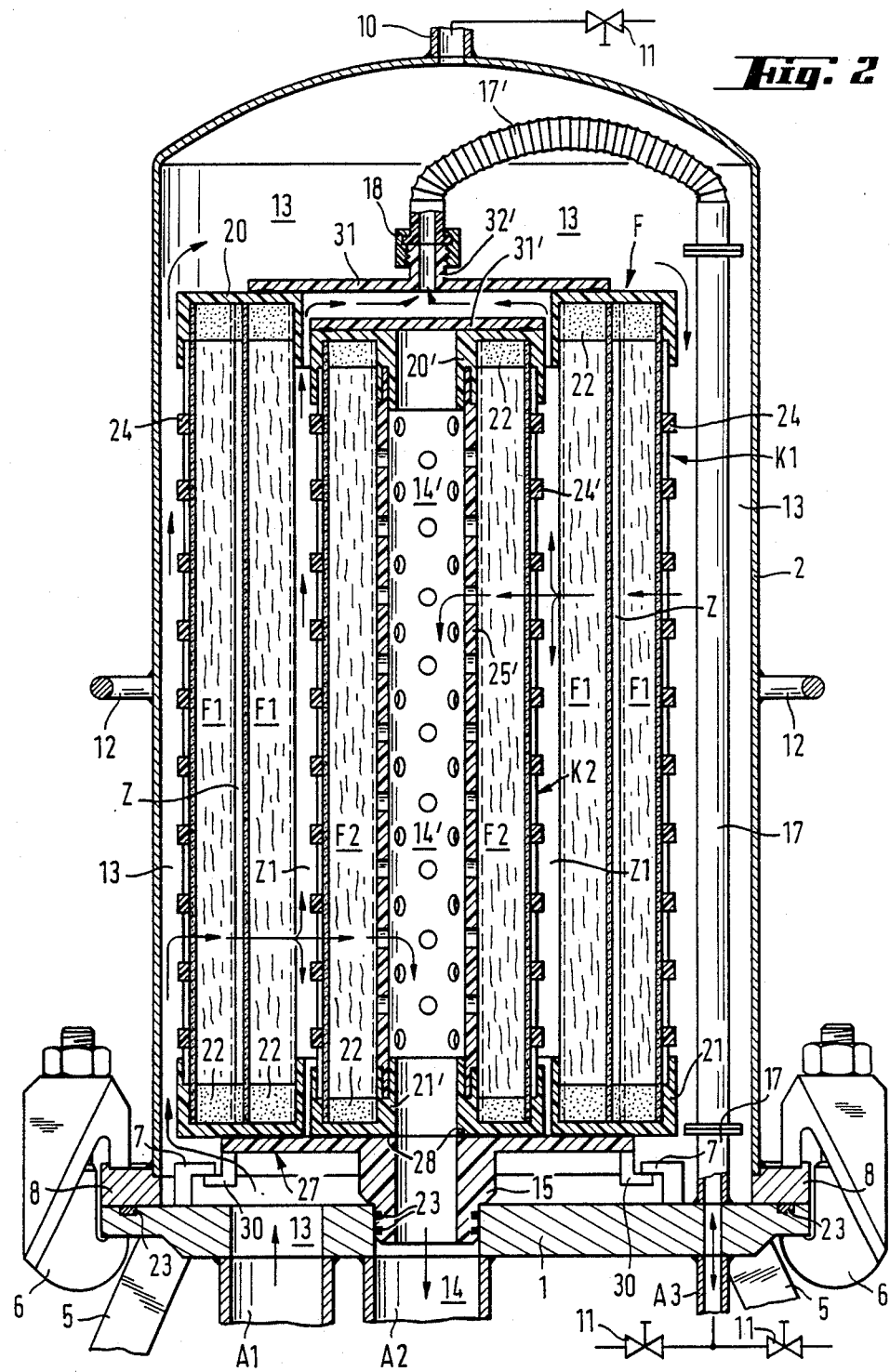
FIG. 2 is a variant thereof.

The variant shown in FIG. 2 corresponds in its design to the embodiment of FIG. 1. In deviation therefrom, connection A3 of the housing runs in the form of a tube 17 in a free space between integral filter F and the inside of upper housing part 2 into its upper free space and is detachably connected by flexible tube section 17' and coupling piece 18 to adapter connection piece 32' of integral filter F. The latter can be locked when upper part 2 is removed via a type of bayonet catch 7,30 to hosing base 1 and connected to coupling piece 18.

Filter cartridge K1 is composed of two pleated filter elements F1 with approximately the same filter area. Intermediary space Z formed thereby can not be separately controlled in this embodiment.

Figure 3:
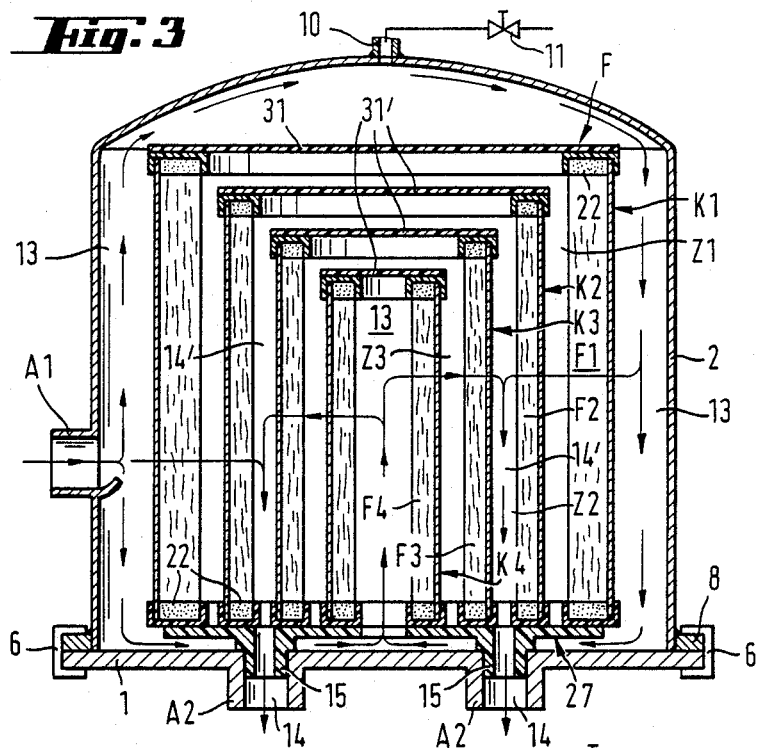
FIG. 3 is a schematically simplified view of a vertical section through a filter housing with an integral filter consisting of four individual filter elements connected in parallel and in series.

The filter device schematically shown in FIG. 3 and consisting of housing and integral filter F logically corresponds to the device shown and described in FIG. 1. Corresponding parts are provided with corresponding reference numbers. This embodiment is relative to filter cartridges K1 to K4 with the filter elements F1–F4 which are mechanically connected to each other, integrated to a unit, series-connected in pairs as regards the flow and whereby both pairs are connected in parallel as regards the flow. This embodiment is relative to an integral filter F which can be used with preference for the filtration of gas with a small number of filter stages but with a requirement for a large filter area. Here too, filter cartridges K1 to K4 can of course have the same overall height in order to make optimum usage of the available space. This drawing was selected solely in order to clarify the various possibilities of variation. Filter cartridges K2 and K3 are the elements thereby which have been tested or can be tested in units for integrity when the flow is as is shown.

Intermediary spaces Z1 to Z3 are also selected as regards their size according to filtration requirements.

Figure 4:
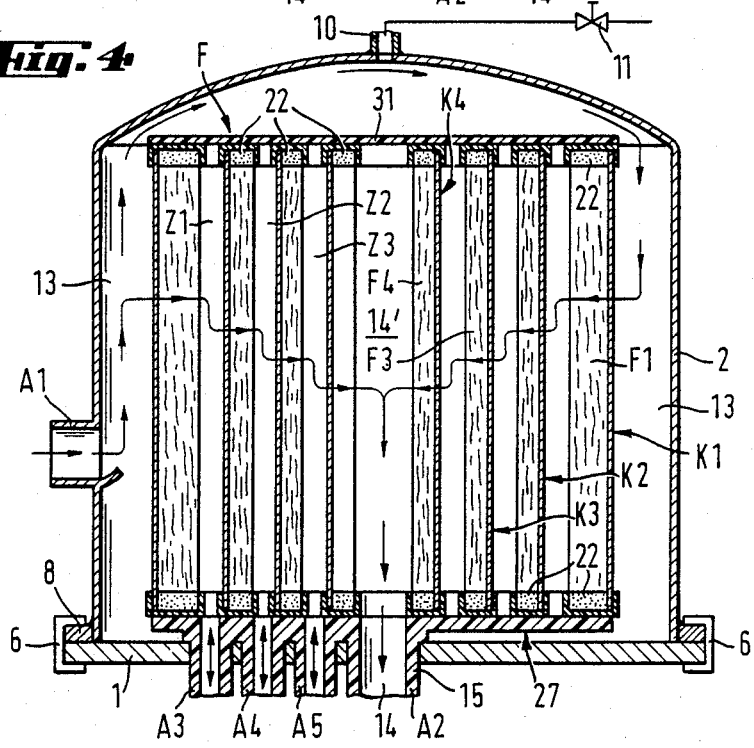
FIG. 4 shows a corresponding view of a housing with integral filter consisting of four individual filter elements connected in series.

The logically designed filter device with integral filter F of FIG. 4 exhibits an integral filter F composed of four filter cartridges K1 to K4 inserted into each other which are connected in series as regards the flow, whereby intermediary spaces Z1 to Z3 and hollow core 14 can be supplied and emptied via connection adapter 27 through connections A1 to A5 with many types of media and can be controlled as regards filtration.

All flow directions indicated in FIGS. 1 to 4 by arrows can of course be reversed or freely selected in accordance with the particular conditions of filtration and testing. If required, intermediary spaces Z1 to Z34 and others can be ventilated by ventilating filters B1 according to FIG. 1 and controlled by tube connections 17,17' so that a certain axial overflow can also be achieved.

Large housings for receiving more than one filter element are known e.g. form DE-PS No. 33 35 938. In order to receive an integral filter according to FIG. 1, connection A3 for adapter connection 32 is run through the sterile chamber to the outside of the housing. Cartridge connection pieces 15 of all filter cartridges empty into the common sterile chamber. Therefore, each integral filter F can be controlled via the associated connecting piece A3, 32 and intermediary space Z1.

Figure 5:
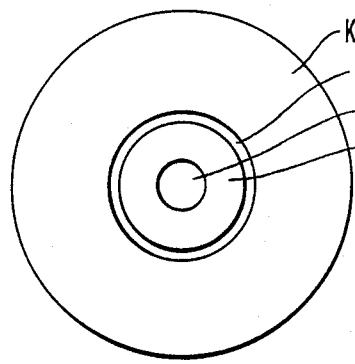
FIGS. 5 to 16 are schematic and simplified views of sections through various filter combinations related to the number of filter stages, geometries, material and filter types.
Figure 6:
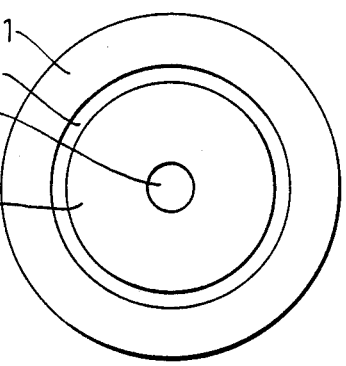
Figure 7:
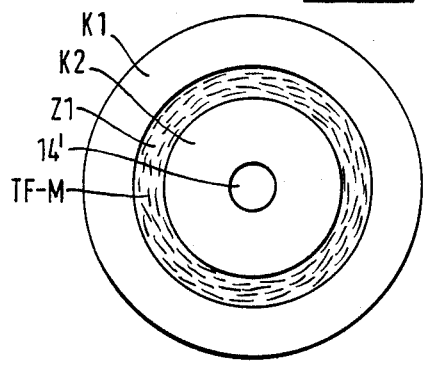
Figure 8:
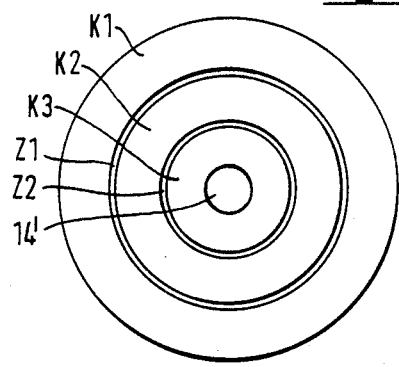
Figure 9:
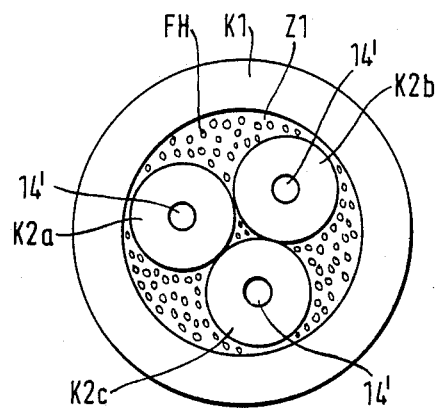
Figure 10:
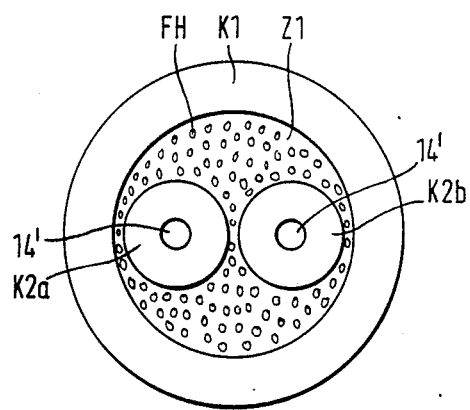
Figure 11:
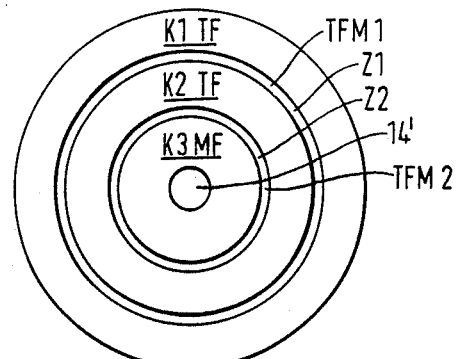
Figure 14:
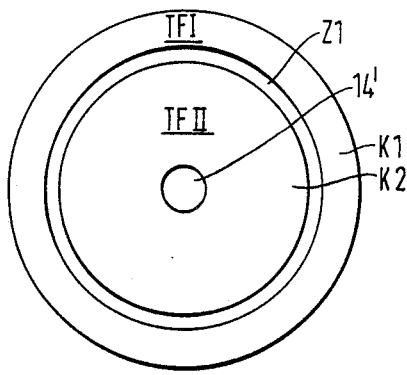
Figure 12:
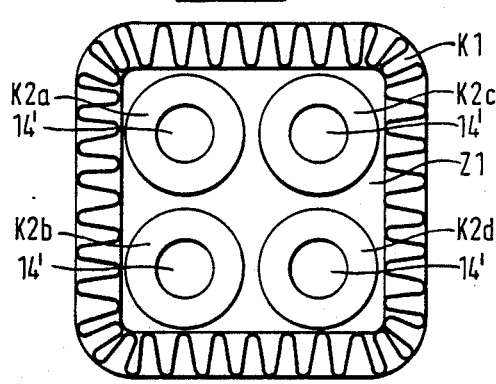
Figure 15:
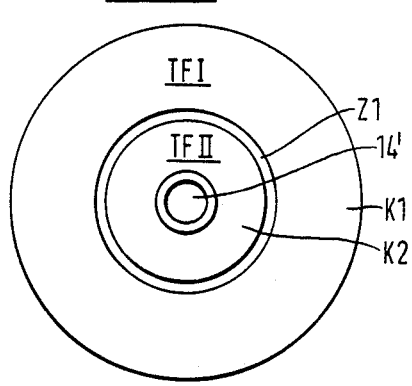
Figure 13:
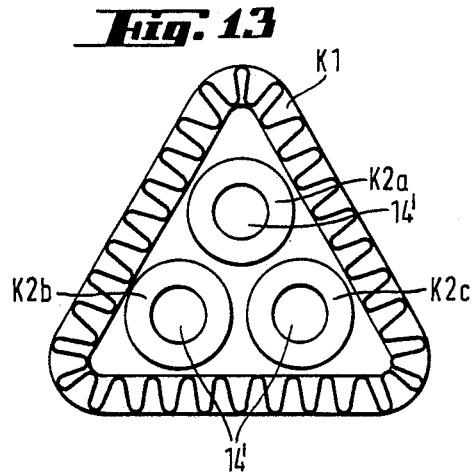
Figure 16:
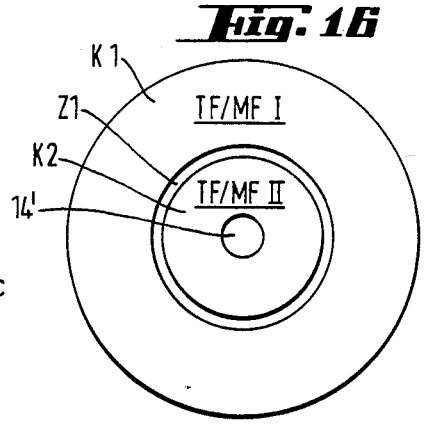

The cross sections of the individual filter cartridges schematically shown in FIGS. 5 to 16 are designed analogously to the previously described integral filter F according to FIG. 1 and to the described modifications. FIGS. 5,6 shown graduations regarding the cartridge diameter. FIGS. 7,8 show variants regarding several filtration stages. FIGS. 9,10 show variations within a filter stage regarding the arrangement of several identical filter cartridges. FIG. 11 shows variations of several filter stages regarding the filter materials. FIGS. 12 and 13 show polygonal tube jackets in pleated form. FIGS. 14 to 16 show variants regarding the coordination of area and filter material in the various stages. The variants are likewise reactive to filter cartridges with various materials in the individual filter stages, with various combinations of filter materials in individual filter stages, with different pore sizes and tested or untested filter elements (integrity filters) in the last stage.

The brief designations used in the figures have the following significance:

| FIG. 6 and | K1 | (filter) cartridge 1 |
|---|---|---|
| FIG. 6 | K2 | cartridge 2 |
| FIG. 7 | TF | deep filter |
| FIG. 8 | K3 | cartridge 3 |
| FIG. 9 | K2a | cartridge 2a within a stage |
| FIG. 10 | K2b | cartridge 2b |
|  | K2c | cartridge 2c |
|  | FH | auxiliary filter means in intermediary area Z |
| FIG. 7 | TF-M | deep filter material in intermediary area Z1 |
| FIG. 9,10 | FH | auxiliary filter means |
| FIG. 11 | K1 TF | cartridge 1, deep filter |
|  | TF-M1 | deep filter material 1 |
|  | K2 TF | cartridge 2, deep filter |
|  | TF-M2 | deep filter material 2 |
|  | K3 MF | cartridge 3, membrane filter |
| FIG. 14 and | TF I | deep filter I |
| FIG. 15 | TF II | deep filter II |
| FIG. 16 | TF/MF I | deep filter/membrane filter I tested |
|  | TF/MF II | coarse deep filter/membrane filter coarse |

As the systematic breakdown, which does not claim to be complete, shows, very varied combinations of the filter materials currently commercially available and to future filter materials are possible with the invention. The innermost filter cartridge can also be formed by a bundle of capillary membranes provides with appropriate adapters on their front sides.

The concepts deep filter, membrane filter, ultrafilter, microfilter have the significance defined in the technical literature. Auxiliary filter means are in particular kieselguhr, perlite, asbestos, cellulose, ion exchange media, drying agents, cataytically active media and activated carbon.

The terms active substances and catalytic substances also denote yeasts and other microorganisms as well as substances which advance the particular special filtration process, which substances are located either in intermediary space Z1 between two filter cartridges of between two filter layers of a filter cartridge of which are located as immobile matter within a filter membrane and influence the filtration process in a favorable manner.

A few practical embodiments for special test solutions are described in the following:

EXAMPLE 1

The arrangement of th described cartridge corresponds to FIG. 1. The radial and area conditions can be described with FIG. 5.

It is relative to an integral filter F for preparing water with a low conductivity and low in particles and colloids like that required e.g. in the laboratory, in the chemical industry and as precursor in the semiconductor industry. K1 contains e.g. filter layers of glass fiber filters for separating colloids.

Intermediary space Z1 is filled with an ion exchange medium which can be selected so as to be specific for the application. An in-situ regeneration is also possible, as is an exchange va connection A3.

K2 acts as a particle rap and contains polypropylene filter fleeces.

K1 and K2 can be subjected to individual tests prior to assembly.

EXAMPLE 2

The arrangement of the described cartridge corresponds to FIG. 1. The radial and a real conditions can be described with FIG. 5 or FIG. 6.

Deep filter media such as glass fiber media, kieselguhr, paper filters and the like are often sufficient for the clarification of spirits. However, if the filter system is located in a bottling line, colloid breakthroughs frequently occur in the case of process interruptions, pressure surges and the like which colloid breakthroughs result in a clouding of the filtrate. The clouding of the filtrate is optically monitored in a permanent fashion in automated systems. Every disturbances results in the filling system being stopped. However, starting and stopping procedures always involve the danger of "breakthroughs" in deep filters. Therefore, the cartridge K1 containing these deep filters is followed within the integral filter element in filter cartridge K2 by a genuine sieve filter which does not permit any breakthrough of clouding substances even in the case of pressure surges. This cartridge is dimensioned in such a manner as regards its area that it does not represent the limiting factor even in the case of partial blockage for the flowthrough per time. Such genuine sieve filter units preferably contain microfilters (membrane filters) with a pore size range of around 1 μm.

The clarification precision can be additionally increased by placing e.g. kieselgughrs into intermediary space Z1. In particular, membrane filter cartridge K2 can be subjected to an integrity test before assembly (ex situ). A test in the housing in situ is also possible. This test can be performed collectively e.g. by means of a pressure retention test in a large housing which contains several intergral filters. Excellent safety is offered solely by the minimized filter area of the safety and testing element.

However, the intergral filters can also be controlled and tested individually, given a suitable pressure control, without having to empty the housing. Only intermediary space Z1 is then emptied. Furthermore, a bleeding of a cartridge K1 leads only to an individual blocking of the integral filter via the blocking of K2. The other integral filters of a large housing continue to filter without disturbance. Downstream cartridge housings are not loaded as a result of defects as long as all K2 cartridges are sound.

EXAMPLE 3

The arrangement of the described cartridge corresponds to FIG. 1. The radial and areal conditions can be described with FIG. 5.

Certain liquids, e.g. beer, still contain so many "colloidal parts" in spite of preclarification and prefiltration in the so-called sterilization stage (cold sterilization by separating out medium-damaging microorganisms by means of microfilters) that an economical filtration is hardly possible in a traditional sense. This is also true e.g. for serum filtration when it is a matter of separating out saracoplasms in a range of 0.1 m.

One possibility is to bring about a reduction of germs by connecting in series several filters in a stepped manner which are similar as regards their separating characteristic without the "first" filter elements blocking prematurely. In this instance, the work is frequently performed with several series-connected filter housings and in case of a blockage or partial blockage of "first filter stages", the equipment of the housings is replaced or the blocked stage removed and all others are advanced by one stage or the blocked stage is replaced exclusively be a new piece of equipment.

This leads to a no longer definable mixing of equipment and is frequently in contradiction with legal regulations which only permit a one-time usage. Mixing of equipment signifies that several filter elements are subjected much more frequently to sterilization cycles than others are and other elements are subjected to a permanent pressure difference because they are partially or entirely blocked. Both instances result in (partially latent) damage which sharply reduces the filtration safety. If the large-area filter element K1 and the small-area filter element K2, which does not limit the flow-through per time, or integrity filter K2 contain filter elements which are similar as regards their separating characteristic, then an economical, "homogeneous" series filtration can be performed without the disadvantages described above. Blocked filter elements are discarded. In particular, membrane filter cartridge K2 can be subjected to an integrity test before assembly. A testing in the housing in situ is also possible. This test can be performed collectively e.g. by means of a pressure retention test in a large housing which contains several integral filters. If only membrane filter cartridges K2 are to be tested, then K1 must comprise hydrophobic edge zones or pleatings or intermediary space Z1 must be able to be ventilated and evacuated via a ventilation filter B1 integrated in closure element 31.

Excellent safety is offered solely by the minimized filter area of safety and testing element K2. However the integral filters can also be controlled and tested individually, given suitable pressure control, without the housing having to be emptied. Only intermediary space Z1 is then emptied.

Moreover, a defect of a cartridge K1 results only in the individual blocking of this integral filter via the blocking of K2. The other integral filters of a large housing continue to filter without disturbance. Downstream cartridges housings are not loaded as a result of defects as long as all K2 cartridges are sound.

EXAMPLE 4

The arrangement of the described cartridge corresponds to FIG. 4. Example 4 differ from example in that solutions are to be filtered which contain colloids and-/or particles with sharply differentiated distribution of size. A varied stepped filtration is necessary for this. This is only economically possible if the individual testable safety element K4 can be tested separately from the actual filter-active elements before assembly and in situ. This is possible by means of the integral filters.

K1 to K3 form the large-area filter-active elements containing numerous membrane filter stages (separating stages) whereas K4 represents the areally minimized testing or safety element. Filter media specifically suited for the application can be placed in intermediary spaces F1 to F3, and K2 and K3 can be eliminated, depending on the application.

In particular, membrane filter cartridge K4 can also be subjected to an integrity test before assembly (ex situ). A testing in housing in situ is also possible. This testing can be collectively performed e.g. by means of a pressure retention test in a large housing containing several integral filters. If only membrane filter cartridges K4 are to be tested, then K1 to K4 must comprise hydrophobic edge zones or pleatings or intermediary spaces Z1 to Z3 must be able to be ventilated and evacuated via a ventilation filter B1 integrated in closure element 31. Excellent safety is offered solely by the minimized filter area of safety and testing element K4. However, the integral filters can also be individually controlled and tested, given suitable pressure control, without the housing having to be emptied. Only intermediary space Z3 in front of the testing element is emptied. Moreover, a defect of a cartridge K1 to K3 results only in an individual blocking of this integral filter via the blocking of K4. The other integral filters of a large housing continue to filter without disturbance. Downstream cartridge housings are not loaded as a result of a defect as long as all K4 cartridges are sound.

EXAMPLE 5

The arrangement of the described cartridge corresponds to FIG. 1. The radial and area conditions can be described with FIG. 6.

The integral filter element described here contains a microfilter unit and ultrafilter unit. This integral filter element is operated counter to the normal direction of filtration. The filter units are connected in a corresponding manner.

Very pure wash water for the production of microchips can be produced with this integral filter. Cartridge K1 containingj the microfilter unit. Cartridge K2 contains the ultrafilter unit, which is considerably larger in are on account of the reduced permeability. K1 has the function of separating out microorganisms whereas even smaller particles or molecules down to pyrogens are intended to be separated out by the ultrafilter unit. In the case of no or slight decrease (slight consumption) of the ultrafiltrate via connection A1, the microfiltrate can be recirculated via the housing connection piece and via upstream filter elements as well as K2. This keeps the system in constant equilibrium, growth of microorganisms is prevented and even a certain crossflow cleaning effect can be assumed for the surface of the ultrafilter unit.

Both membrane filter elements can be subjected to an integrity test before assembly. A testing in the housing is also possible. This testing can be collectively performed, e.g. by means of a pressure retention test in a large housing containing several integral filter elements. If only membrane filter cartridges K2 are to be tested, the testing medium (compressed air in the pressure retention test) is supplied via the inner core of the integral filters. Excellent safety is offered solely by the minimized filter area of safety and testing element K2. However, the K1 and K2 elements of the integral filters can also be individually controlled and tested, given suitable pressure control, without the housing having to be emptied. Only intermediary space Z1 is emptied.

Moreover, as defect of a cartridge K2 results only in an individual blockage of this integral filter via the blocking of K1. The other integral filters of a large hosing continue to filter without disturbance. Downstream cartridge housings are not loaded as a result of a defect as long as all K1 cartridges are sound.

EXAMPLE 6

The arrangement of the described cartridge corresponds to FIG. 3. The radial and areal conditions are selected so that K1 and K4, K2 and K3 each have the same magnitude.

The filter media or filter units of K1 to K4 are permanently hydrophobic (e.g. polytetrafluoroethylene polypropylene). K1 and K2 as well as K4 and K3 are connected in series. Intermediary spaces Z1 and Z2 between K1 and K2 and K4 and K3 aee free or filled e.g. with drying media or activated carbon. Elements K2 and K3 and thus also the intermediary spaces can naturally be eliminated if the main goal is a large filtration area.

The individual piece testing of K2 to K3 before assembly saves expense and increases safety. See the preceding examples regarding in situ testing.

Furthermore, the element is designed in such a manner that it can be operated in the same manner in both directions of flow, that all flow conduits are coordinated with each other in an optimal manner and the formation of zones of water of condensation is totally excluded.

We claim:

1. A tubular filter means enclosed in a housing mean, said tubular filter means including a plurality of tubular filters each of a different diameter size and are positioned in said housing means concentrically, each of said tubular filters being radially dimensioned in thickness to provide spaces therebetween and an axial core space in an innermost tubular filter, said tubular filter means having a first cap at an end of the tubular filter means and a second cap at the other end of the tubular filter means, said housing means including a tubular shell, said shell being dimensioned to define a space about the filters, said tubular shell having a top and an open bottom, a bottom means adapted and constructed to be detachably secured to the tubular shell to complete the said housing means, the tubular filter means mounted on the said bottom means internally of said housing means, as axial conduit in said second cap and bottom means fluidly communicating said axial core space externally of said housing means, at least one further conduit means in said bottom means communicating said space between said tubular filters externally of said housing means and including a tube fluidly connecting through said bottom and extending upwardly through said space between the tubular filter means and said housing means to a tubular connection through said first cap to a space between said tubular filters, and at least one of the spaces between the tubular filters filled with a filter medium.

2. The tubular filter means of claim 1 wherein the filter medium in at least one of the spaces between the tubular filters is an ionic exchange medium.

* * * * *